United States Patent
Takeshima et al.

[11] Patent Number: 6,083,467
[45] Date of Patent: Jul. 4, 2000

[54] EXHAUST GAS PURIFYING CATALYST AND PROCESS FOR PRODUCING THE SAME

[75] Inventors: Shinichi Takeshima, Susono; Toshiaki Tanaka, Numazu; Tetsuya Yamashita, Susono; Satoshi Iguchi, Mishima; Katsuhiko Wakabayashi; Masahiro Kishida, both of Fukuoka, all of Japan

[73] Assignees: Toyota Jidosha Kabushiki Kaisha, Toyota; Katsuhiko Wakabayashi, Fukuoka, both of Japan

[21] Appl. No.: 09/017,027

[22] Filed: Feb. 2, 1998

[30] Foreign Application Priority Data

Feb. 5, 1997 [JP] Japan .................. 9-048620

[51] Int. Cl.⁷ ........................................ B01J 8/02
[52] U.S. Cl. ............... 423/335; 423/213.5; 423/239.1; 423/628; 502/349; 502/350; 502/351; 502/352; 502/353; 502/354; 502/355; 502/407; 502/414
[58] Field of Search ..................... 423/600, 608, 423/213.5, 213.7, 239.1, 335, 628; 502/300, 303, 304, 308, 313, 325, 326, 333, 334, 339, 349, 350, 351, 352, 353, 354, 355, 407, 414

[56] References Cited

FOREIGN PATENT DOCUMENTS

| 3-186 347 | 8/1991 | Japan . |
| 7-246 343 | 9/1995 | Japan . |
| 8-131 830 | 5/1996 | Japan . |

*Primary Examiner*—Tom Dunn
*Assistant Examiner*—Cam N. Nguyen
*Attorney, Agent, or Firm*—Oliff & Berridge, PLC

[57] ABSTRACT

An exhaust gas purifying catalyst in which catalytic activation particles 3 composed of a catalytic element or its compound are carried on a carrier 1. The catalytic activation particles 3, as carried on the carrier 1 and exposed to the outside of the carrier 1, are coated with the carrier 1 by 20 to 90% of their whole surface area. Also disclosed is a process for producing the exhaust gas purifying catalyst.

6 Claims, 4 Drawing Sheets

|  | AVERAGE Pt PARTICLE DIAMETER (nm) | | | |
| --- | --- | --- | --- | --- |
|  | INITIAL | 2 h | 12 h | 48 h |
| IMPREGNATION METHOD (Prior Art 1) | 0.8 | 15 | 30 | 50 |
| AFTER ALUMINA COATING METHOD (Embodiment 1) | 1.5 | 2.4 | 2.5 | 2.5 |
| MICLO EMULSION METHOD (Embodiment 2) | 1.5 | 2.1 | 2.1 | 2.1 |

FIG. 9

|  | 50% PURIFICATION TEMPERATURE (°C) | | |
| --- | --- | --- | --- |
|  | HYDRO-CARBONS | CO | NOx |
| IMPREGNATION METHOD (Prior Art 1) | 345 | 324 | 355 |
| AFTER ALUMINA COATING METHOD (Embodiment 1) | 267 | 233 | 256 |
| MICLO EMULSION METHOD (Embodiment 2) | 275 | 246 | 260 |

FIG. 10

|  | 50% PURIFICATION TEMPERATURE (°C) | | |
| --- | --- | --- | --- |
|  | HYDRO-CARBONS | CO | NOx |
| PRIOR ART 2 | 242 | 218 | 243 |
| PRIOR ART 3 (Pt 1.2g/ℓ, Rh 0.4g/ℓ) | 221 | 206 | 212 |
| EMBODIMENT 3 | 209 | 191 | 196 |
| EMBODIMENT 4 | 201 | 187 | 190 |
| COMPARISON 1 | 250 | 221 | 256 |
| COMPARISON 2 | 245 | 222 | 242 |

FIG. 11

|  | PURIFICATION TEMPERATURE (°C) of $C_3H_6$ by 50% |
|---|---|
| PRIOR ART 4 | 245 |
| PRIOR ART 5 : Pd5g/ℓ CARRIAGE | 190 |
| EMBODIMENT 7 | 194 |

FIG. 12

|  | PURIFICATION TEMPERATURE (°C) of $C_3H_6$ by 50% |
|---|---|
| PRIOR ART 4 | 304 |
| PRIOR ART 6 : Ba CARRIAGE (30wt. %) | 246 |
| EMBODIMENT 7 | 245 |
| EMBODIMENT 8 | 212 |

FIG. 13

|  | PURIFICATION TEMPERATURE (°C) of NO by 50% |
|---|---|
| EMBODIMENT 9 | 295 |
| EMBODIMENT 10 | 256 |

EXHAUST GAS PURIFYING CATALYST AND PROCESS FOR PRODUCING THE SAME

BACKGROUND OF THE INVENTION

1. Field of the Invention

The present invention relates to a catalyst for purifying an exhaust gas and, more particularly, to a catalyst for purifying an exhaust gas to be discharged from an internal combustion engine for a vehicle.

2. Related Art

An exhaust gas purifying catalyst of this kind, as known in the prior art, is constructed by carrying a catalytic element such as platinum, palladium or rhodium on a carrier such as alumina. This exhaust gas purifying catalyst exhibits a high purifying ability because its catalytic particles keep a predetermined particle diameter and disperse homogeneously to some extent. However, this exhaust gas purifying catalyst is used in an environment of a hot atmosphere as high as several hundreds °C. In addition, an engine for a lean-burn run at a large air/fuel ratio has been developed in recent years so that the exhaust gas purifying catalyst is held in an environment of a high oxygen concentration. As a result, the sintering of the catalytic particles gradually advances to raise a disadvantage that the catalyst is seriously deteriorated.

In the prior art, there have been investigated a variety of techniques for inhibiting the agglomeration of catalyst particles, including the catalyst which is constructed by dispersing and adhering magnesium to the catalytic activation particles of platinum or palladium, as disclosed in Japanese Patent Laid-Open No. 186347/1991 (JP-A-3-186347). In this catalyst, it is thought that the catalytic activation particles of palladium or the like are prevented from agglomeration by solidifying magnesium thereon.

In Japanese Patent Laid-Open No. 131830/1996 (P-A-8-131830), on the other hand, there is disclosed an exhaust gas purifying catalyst which is constructed with platinum and alumina carrying the former and is coated in its entirety with ceria ($CeO_2$). In the catalyst disclosed, the oxidation of platinum and its migration in gas phase are prevented by the oxygen occluding action of ceria so that the sintering of platinum is prevented.

In Japanese Patent Laid-Open No. 246343/1995 (JP-A-7-246343), moreover, there is disclosed a process for producing a catalyst by dissolving metal alkoxide gradually in the presence of water into a dispersion of super fine particles having catalytic activity to cause a hydrolysis of the metal alkoxide thereby to produce a colloidal metal oxide. This catalyst is exemplified by silica gel of about 20 to 40 nm (nanometers) carrying platinum or rhodium particles of 4 nm.

Here, the sintering of noble metal particles to be used as the catalytic particles is divided into the sintering to be caused by a particle migration from a relatively low temperature and the sintering to be caused by an atomic migration at a relatively high temperature. However, the invention, as disclosed in Japanese Patent Laid-Open No. 186347/1991 (JP-A-3186347), is intended to prevent the agglomeration of the catalytic activation particles by the solid solution of magnesium but has no function to prevent or inhibit the particle migration itself. As a result, the sintering cannot always be sufficiently prevented so that the catalytic activation is liable to lower with the time.

On the other hand, the catalyst, as disclosed in Japanese Patent Laid-Open No. 131830/1996 (JP-A-8-131830), is intended to lower the peak concentration of oxygen by the oxygen occluding action of ceria thereby to prevent the migration of $PtO_2$ in gas phase. However, the particle migration, as would occur at a lower temperature, is difficult to inhibit. After all, there is a problem that the activity is gradually lowered by the sintering of the catalytic particles of platinum or the like.

In the catalyst producing process disclosed in Japanese Patent Laid-Open No. 246343/1995 (JP-A-7-246343), moreover, the carrier is formed after the super fine particles having the catalytic activity are formed. However, it is difficult to prepare metal oxide particles having equal particle diameters because the metal alkoxide for the carrier material is dissolved into the dispersion of those super fine particles. Moreover, the resultant structure, in which the catalytically active super fine particles are adhered to the surfaces of the metal oxide particles, makes it difficult to give a function to prevent or inhibit the migration of the catalytic particles. In the catalyst thus produced by this process, therefore, the drastic inhibition of the sintering of the catalytic particles is still difficult and leaves room for improvements.

SUMMARY OF THE INVENTION

The invention has been conceived to solve the aforementioned technical problems of the prior art and has a main object to provide an exhaust gas purifying catalyst which is enabled to have an excellent durability and to improve a carrying efficiency by controlling the particle diameter of catalytic element particles and the mode of carrying them, and a process for producing the catalyst.

In order to achieve the above-specified object of the invention, there is provided an exhaust gas purifying catalyst in which catalytic activation particles composed of a catalytic element or its compound are carried on a carrier, wherein the catalytic activation particles, as carried on the carrier and exposed to the outside of the carrier, are coated with the carrier by 20 to 90% of their whole surface area. Here, the extent of exposure of the catalytic activation particles can be determined by measuring the particle diameter from a dark field image of a transmission electron microscope (TEM), for example. By the chemical adsorption of carbon monoxide gas, on the other hand, the carbon monoxide molecules are adsorbed by the surfaces of the catalytic activation particles. From this adsorption, the surface area (or atomic number) of the exposed catalytic activation particles is determined to determine the particle diameter of the catalytic activation particles. Thus, the exposure extent can be expressed by the ratio of those particle diameters in the following manner:

Exposure Extent
=(Particle Diameter by TEM Observation)/
Particle Diameter by CO Adsorption).

In the catalyst of the invention, therefore, the catalytic activation particles are deeply buried in the carrier and inhibited from any migration by the carrier so that the sintering and the according reduction in the catalytic activity are prevented. In short, the durability is improved.

In the invention, moreover, the aforementioned catalytic activation particle can be constructed by mounting a second metal particle having a catalytic activity on the surface of a first metal particle having a catalytic activity.

With this construction, in addition to the actions similar to the aforementioned ones, the second metal particle, as mounted on the first metal particle, exhibits a high catalytic activity so that the catalyst can have an excellent activity in its entirety even in a small quantity of the second metal particle. In short, it is possible to reduce the catalytic element to be used.

In the invention, moreover, the first metal particle can be made of platinum, and the second metal particle can be made of rhodium. Alternatively, the second metal particle can be made of rhodium, and the carrier can be made of alumina.

With this construction, the reaction between the rhodium and the carrier can be inhibited to keep the rhodium in the particle state to improve the carrying efficiency. In other words, the quantity of rhodium to be used can be reduced to lower the cost without degrading the catalytic activity.

In the invention, on the other hand, there can be made a structure in which a reaction inhibiting agent for inhibiting the reaction between the aforementioned carrier and the catalytic activation particles is adhered to the surface of the carrier.

With this construction, the reaction between the catalytic activation particles and the carrier can be prevented to keep the catalytic activation particles highly active thereby to improve the durability of the whole catalyst.

According to the invention, there is provided a process for producing an exhaust gas purifying catalyst in which catalytic activation particles composed of a catalytic element or its compound are carried on a carrier, comprising: a first step of carrying the catalytic activation particles on the carrier; and a second step of adhering, to the surface of the carrier carrying the catalytic activation particles, a material identical with or different from the material of the carrier in a single- or multi-layered thin film.

According to the process of the invention, the catalytic activation particles can be so buried with the material newly adhered at the second step that its exposure extent (or coating extent) may take a predetermined value. As a result, the migration of the catalytic activation particles can be inhibited or prevented to prevent the deterioration of the durability, as might otherwise be caused by the sintering.

According to the invention, there is provided another process for producing an exhaust gas purifying catalyst in which catalytic activation particles composed of a catalytic element or its compound are carried on a carrier, comprising: a step of depositing/agglomerating the catalytic activation particles into a predetermined particle diameter; and a step of forming the carrier around the catalytic activation particles.

According to this process, therefore, the catalytic activation particles can be so buried in the carrier that its exposure extent (or coating extent) may take a predetermined value. As a result, the migration of the catalytic activation particles can be inhibited or prevented to prevent the deterioration of the durability due to the sintering.

According to the invention, there is provided still another process for producing an exhaust gas purifying catalyst in which catalytic activation particles composed of a catalytic element or its compound are carried on a carrier, comprising: a step of forming a micelle containing the catalytic activation particles by agitating/mixing a micro emulsion containing the catalytic activation particles prepared to a predetermined particle diameter, into a surface-active agent containing the carrier element; and a step of forming the carrier to enclose the catalytic activation particles in the micelle.

According to this process, therefore, the hydrolysis of the carrier element progresses in the interface of the micro emulsion containing the catalytic activation particles so that the carrier is formed to bury the catalytic activation particles and to grow highly with respect to the catalytic activation particles. As a result, the catalyst, as produced by the process of the invention, is given a structure, in which the catalytic activation particles are buried in the carrier to have a predetermined exposure extent (or coating extent), so that the particle migration can be inhibited to provide the catalyst which is free from the sintering.

According to the invention, there is provided still another process for producing an exhaust gas purifying catalyst in which catalytic activation particles composed of a catalytic element or its compound are carried on a carrier, comprising: a step of depositing/agglomerating the catalytic activation particle, which are composed of at least two kinds of elements including platinum, rhodium and p alladium or compounds of the individual elements, to a predetermined particle diameter; and a step of forming the carrier around the catalytic activation particles.

According to this process, therefore, the catalyst can be given a structure, in which other catalytic activation particles are adhered to the catalytic activation particles of one kind, to inhibit the reaction between the other catalytic activation particles and the carrier so that the catalyst produced can have an activity kept in a high state.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The invention will be described more specifically. In the exhaust gas purifying catalyst of the invention, the catalytic activation particles are carried by a carrier as in the prior art, but the invention is characterized by the carrying manner in which 20 to 90% of the whole surface area of the catalytic activation particles is covered with the carrier. In other words, the catalytic activation particle are in such a buried state by the carrier as to have 10 to 80% of exposure. This is conceptionally illustrated in FIG. 1A, in which a carrier 1 is recessed at 2 to bury a catalytic activation particle 3 while being partially exposed to the outside. Here, the catalytic activation particle 3 has a diameter of about 1 to 3 nm.

Figure 1A:
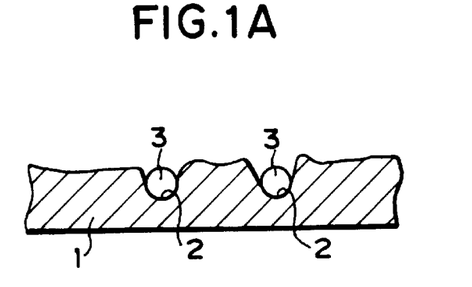
FIG. 1A is a diagram conceptionally showing a mode of the invention, in which catalytic activation particles are carried in a catalyst.
Figure 1B:
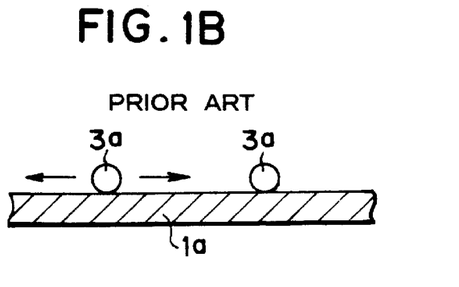
FIG. 1B is a diagram conceptionally showing a mode of the prior art, in which catalytic activation particles are carried in a catalyst.

In contrast to this, there is illustrated in FIG. 1B a carrying mode of the catalytic activation particle of the prior art. This mode is exemplified by carrying a catalytic activation particle 3a on a carrier 1a by the impregnation method or by adsorbing the catalytic activation particle 3a to the carrier 1a. In this mode, the catalytic activation particle 3a is adhered to the surface of the carrier 1a, as could be deemed as a flat surface in comparison with the size of the catalytic activation particle 3a.

Thus, the catalyst of the invention is given a structure in which the catalytic activation particles are, so to speak, mechanically trapped by the carrier and prevented from any migration. In the catalyst of the prior art, on the contrary, most of the catalytic activation particles are merely arranged on the substantially flat face so that they have a high degree of freedom for the migrations.

Figure 2:
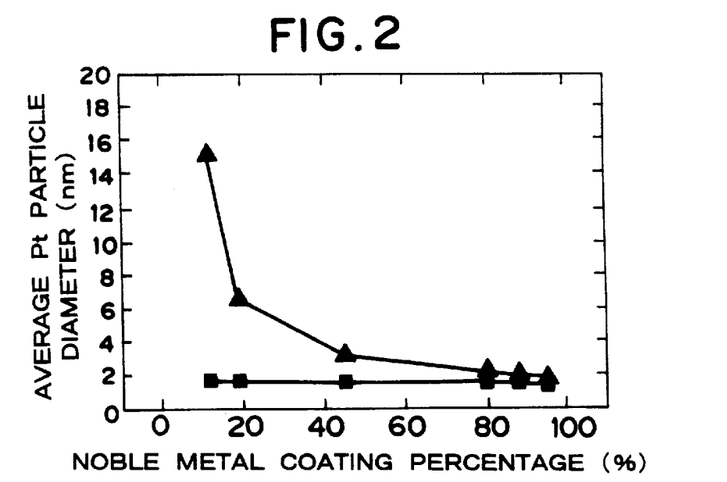
FIG. 2 is a diagram plotting the measured results of relations between a coating percentage by a carrier of Pt particles in the catalyst of the invention and an average particle diameter of the Pt particles after heated.

In the invention, moreover, 20 to 90% (i.e., a coating percentage of 20 to 90%) of the whole surface area of the catalytic activation particles is coated for the following reasons. The carrying mode, in which the catalytic activation particles are buried in the carrier, can be prepared by the later-described so-called "micro emulsion method", for example. Relations between the average particle diameter of the catalytic activation particles (e.g., platinum particles) and the coating percentage is plotted in FIG. 2. Here in FIG. 2, symbols ■ indicate the state of a new product, and symbols ▲ indicate the state after being heated in the air at 700° C. for 48 hours. It is seen from FIG. 2 that the increase in the particle diameter after the heating is prominent for a coating percentage less than 20% so that a sufficient sintering effect cannot be achieved.

Figure 3:
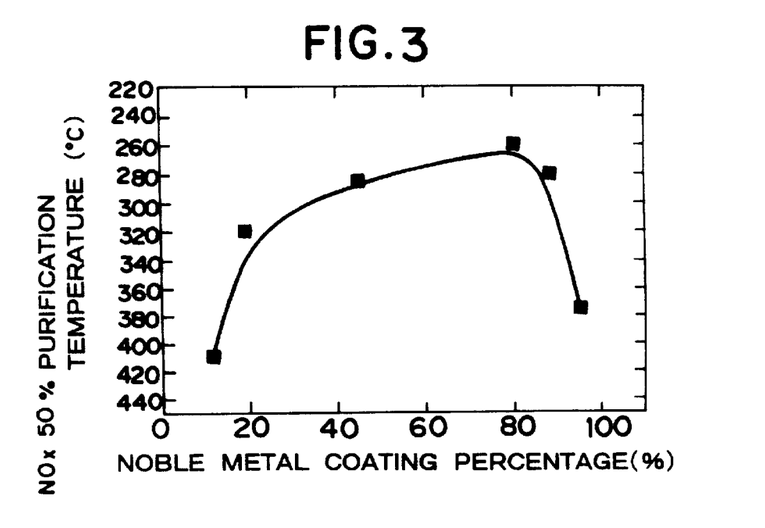
FIG. 3 is a diagram plotting the measured results of relations between a coating percentage by a carrier of catalytic metal in the catalyst of the invention and a purification temperature of nitrogen oxides by 50%.

On the other hand, FIG. 3 plots the results of measurements of the purification temperature of 50% of nitrogen oxides by the platinum catalyst.

It is seen from FIG. 3 that the purification temperature rises for a coating percentage more than 90% so that the catalytic activation drops from the beginning to an impractical level. In the invention, therefore, the coating percentage is set to 20 to 90%. Here, this coating percentage is determined from (100 - Exposure Extent) % on the basis of the aforementioned exposure extent.

On the other hand, the metal element to be employed as the catalytic activation particles in the invention is either a metal containing at least one kind of platinum (Pt), rhodium (Rh), palladium (ed), iridium (Ir), ruthenium (Ru), osmium (Os), gold (Au) and silver (Ag) or its metal oxide. Moreover, the carrier to be employed in the invention is a metal oxide containing at least one kind of various aluminas, titania, silica, zirconia, ceria, magnesia, tin oxides and antimony oxides.

Figure 4:
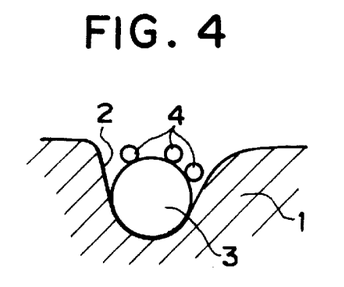
FIG. 4 is a diagram conceptionally showing a structure in which Rh particles are carried on a Pt particle in accordance with the invention.

In the invention, moreover, the catalytically active metal particles to be carried may be composed of a plurality of kinds of particles such that second metal particles are arranged on the surfaces of first metal particles. In the most typical embodiment, as conceptionally shown in FIG. 4, rhodium particles 4 are arranged on the platinum particle 3, and the carrier 1 is exemplified by alumina. By thus employing the noble metal carrying another kind of metal as the catalytic activation particles, the particles of another kind of metal carried by the noble metal particles can be prevented from reacting with the carrier to lose its catalytic activity, even for a high affinity between the particles of another metal carried by the noble metal particles and the carrier, so that the carrying efficiency of the metal particles can be improved. In short, a catalyst having a high exhaust gas purifying ability can be produced with a less number of catalytic activation particles.

Even when a plurality of kinds of such catalytically active materials are used, it is possible to select and employ the individual metals and their oxides suitably. This combination can be exemplified by the construction, in which the rhodium particles are carried on the platinum particles, in which the rhodium particles are carried on the palladium particles, or in which the palladium particles are carried on the platinum particles. The reason why the rhodium is selected from them and is arranged on particles of another metal is intended to prevent the catalytic activity from being lost by the structure in which rhodium is extended over the surface of alumina because a metal oxide such as the alumina acting as the carrier has a high affinity with rhodium. Moreover, the quantitative ratio (i.e., weight ratio) between the metal particles and particles of another kind of metal to be carried by the former is exemplified by the former "6" and the latter "1".

As described hereinbefore, some metal having the catalytic activity has a high affinity with the metal oxide such as alumina making the carrier. If a combination of the catalytic substance and the carrier substance is adopted, the catalytic substance may spread widely over the surface of the carrier to lower the catalytic activity. In order to prevent this, the exhaust gas purifying catalyst of the invention can be given, in addition to the structure in which the catalytic activation particles are coated with the aforementioned carrier, a structure in which a substance for inhibiting the reaction with the carrier is selectively formed on the surface of the carrier and around the catalytic activation particles.

With this structure, the catalytic noble metal particles are prepared to have a particle diameter of 2 to 10 nm, for example, to carry a reaction inhibiting substance highly densely around the catalytic noble metal particles. These catalytic noble metal particles can be made of the aforementioned various metals or their oxides. Moreover, the reaction inhibitor can be exemplified by a compound of barium, zirconium, lanthanum, neodymium, praseodymium or silicon. If palladium is adopted as the catalytic metal, it is preferred to employ a barium compound as the reaction inhibitor. If rhodium is adopted as the catalytic metal, it is preferred to employ a zirconium compound as the reaction inhibitor.

Figure 5:
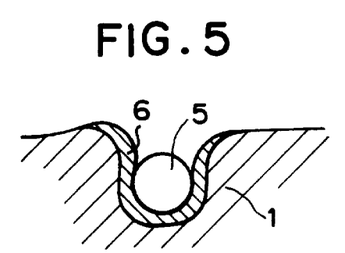
FIG. 5 is a diagram conceptionally showing a structure in which a barium carbonate layer is formed around a Pd particle in accordance with the invention.

The structure, in which the reaction inhibiting substance is carried on the catalytic activation particle, is conceptionally shown in FIG. 5. In this structure, for example, a barium carbonate layer 6 is formed on the surface of the carrier 1 around a palladium particle 5. Here, the quantitative ratio (i.e., weight ratio) of the catalytic activation particle to the reaction inhibitor is set to about 1:50.

Here will be described a process for producing the exhaust gas purifying catalyst according to the invention. The exhaust gas purifying catalyst of the invention has a coating percentage of 20 to 90% of the catalytic activation particle with the carrier. When the exhaust gas purifying catalyst is to be produced, it is possible to adopt a method of forming a thinner layer on the surface of the powder carrying the catalytic activation particle. At a first step, more specifically, there is prepared the powder in which the catalytic activation particle is carried on the carrier. The noble metal or its oxide to be used for the catalytic activation particle and the metal oxide to be used for the carrier are individually the aforementioned ones.

At this first step, the catalytic activation particle can be carried on the carrier by agitating and mixing carrier powder into a solution containing catalytic activation particles made of a catalytic element or its compound to adhere the catalytic activation particles to the carrier and by subjecting the mixture to a suitable treatment such as a reduction. In this case, the diameter of the catalytic activation particles is preferably adjusted to about 2 to 10 nm. For this treatment of platinum powder, for example, a solution of dinitroammine platinum may be used and mixed with γ-alumina powder and may then be reduced. This reducing treatment may be exemplified by a suitable method such as a reduction with hydrogen. Here, a solution capable of generating the catalytic activation particles by the reduction can be exemplified by a solution of tetraammine Pt for platinum. For rhodium, on the other hand, a solution of rhodium chloride or rhodium nitrate can be used. For palladium, moreover, a solution of palladium chloride or palladium nitrate can be used.

At a second step, on the other hand, the aforementioned powder carrying the catalytic activation particles is agitated and mixed with the solution containing the carrier element to adhere a carrier element additionally. The quantity of this new carrier of this case can be adjusted according to the concentration of the solution. When the carrier is made of alumina, more specifically, it is possible to employ a solution which is prepared by dissolving aluminum isopropoxide into cyclohexane. Aluminum butoxide can also be employed. The thin layer to be newly formed at the second step is formed of a single layer or a plurality of layers having a thickness of an order of several nm, in which a plurality of atoms are stacked, and has a concentration of 5 to 20×10$^{-3}$ moles per unit surface area (1 m$^2$/g) of the powder or base material. As a result, the coating percentage of the catalytic activation particles is 20 to 90%.

Here will be described the micro emulsion method. According to the micro emulsion method of the invention, the micro emulsion having a sedimentation of a catalytic element or its compound is agitated and mixed with a solution containing a carrier element to cause a hydrolysis of the compound of the carrier element in the interface of a micelle containing the catalytic element. In other words, the micro emulsion is mixed into either an environment, in which the carrier element or its compound exists relatively much, or an environment in which the concentration is high, to produce the carrier around the sedimentation of the catalytic element or its compound. As a result, the particle diameter of the powder of the catalytic metal carrier obtained is far larger than that of the catalytic activation particles so that these catalytic activation particles are substantially homogeneously dispersed. Here, the degree of this dispersion is exemplified by 20%.

According to the process of the invention, there is used a dispersion prepared by using the micro emulsion, in which an aqueous solution containing a water soluble metal compound of the catalytic element is present in the form of liquid droplets of super fine particles, by sedimenting or reducing the metal compound to insolubilize it, and by dispersing the solution containing the insolubilized catalytic element in liquid droplets (or in a micro emulsion) of the super fine particles The metallic salt acting as a source for the catalytic metal can employ those which are exemplified in Japanese Patent Laid-Open No. 246343/1995 (JP-A-7-246343), such as a solution of platinic chloride, rhodiumic chloride, Pt dinitroammine, Rh nitrate, Pd nitrate, Pd chloride or Pt tetraammine.

When the sedimentation containing a catalytic metal element is to be formed in the aforementioned liquid droplets of the super fine particles, on the other hand, the micro emulsion of ammonium chloride can be used to form the sedimentation of ammonium chloride of Pt or Rh. On the other hand, the particles of the catalytic metal can be formed by reducing dinitroammine of Pt, Pt nitrate, Rh nitrate or Pd nitrate with hydrazine-monohydrate. In this case, the hydrazine-monohydrate is used as the micro emulsion. Another reduction method can be exemplified by a reducing method with boron-sodium hydroxide or by bubbling with H$_2$ gases.

Figure 6:
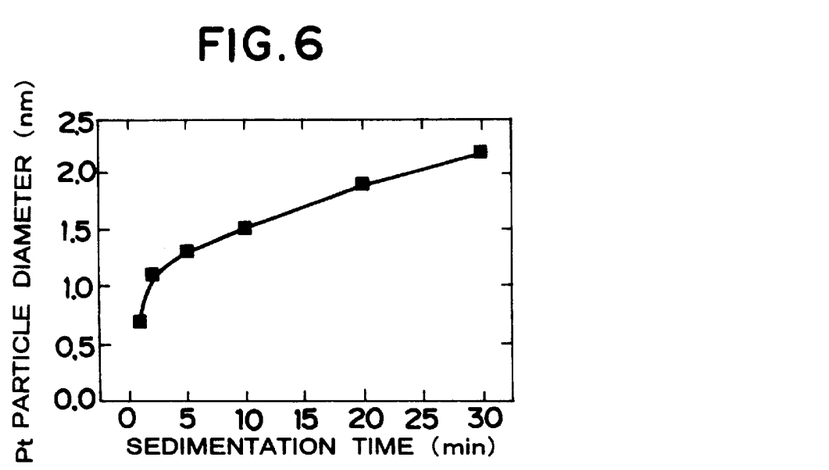
FIG. 6 is a diagram plotting a relation between a sedimentation time and a particle diameter of a catalytic activation particle in accordance with a process of the invention.

When the sedimentation is to be formed by using the aforementioned solution, it aggregates to become coarse as the time elapses, as shown in FIG. 6 for platinum, so that the catalytic activation particles take an accordingly large diameter. In order to produce the catalytic activation particles of the target diameter, therefore, the time period may be controlled for forming the sedimentation. When the catalytic activation particles are to be produced by the reduction, on the other hand, the diameter of the particles is enlarged with the lapse of the agitating and mixing time period of the reducing agent so that it can be controlled by the reducing time period.

An organic solvent for a dispersion medium of the micro emulsion can be exemplified by those specified in Japanese Patent Laid-Open No. 246343/1995 (JP-A-7-246343), a kind or as a mixture of hydrocarbons such as cyclohexane or benzene, straight-chain alcohol such as hexanol, or ketones such as acetone. On the other hand, the surface-active agent can also be exemplified by those specified in Japanese Patent Laid-Open No. 246343/1995 (JP-A-7-246343), a kind or a mixture of triethyleneglycol-p-nonylphenyl ether (as will be abbreviated to "NP-5"), pentaethylene glycol decyl ether, di-2-ethylene hexylsulfo sodium succinate or cetyl trimethyl ammonium bromide.

A process characterizing the invention is to agitate and mix the micro emulsion containing the sedimentation or particles of the catalytic metal, gradually with the metallic alkoxide dispersion liquid. This process is contrary to that of the invention of Japanese Patent Laid-Open No. 246343/1995 (JP-A-7-246343), in which the metallic alkoxide dispersion liquid is gradually agitated and mixed with the dispersion of the micro emulsion. According to the process of the invention, therefore, the micro emulsion containing the catalytic activation particles is dipped in the environment in which the metallic alkoxide is dense.

As a result, the metallic alkoxide is subjected to a hydrolysis in the interface of either the sedimentation of the catalytic metal compound (or complex) or the micelle of the catalytic activation particles thereby to prepare the carrier. The metallic alkoxide to be employed in the invention is exemplified by aluminum isopropoxide, titanium isopropoxide, zirconium t-butoxide or tetraethoxysilane.

As a result of the hydrolysis of the metallic alkoxide, the carrier is formed around the sedimentation or particles of the catalytic metal in the micelle so that the catalytic metal can be carried in a state in which it is buried in the carrier. The hydrolysis is performed to set the coating percentage of the catalytic activation particles to 20 to 90%. This coating percentage can be controlled according to the conditions of the hydrolysis and is controlled to a desired value by adjusting the kind of a surface- active agent, the quantity of water and the pH suitably.

Here, the catalytic metal element in the aforementioned micro emulsion should not be limited to one kind, but a plurality of kinds of catalytic metal elements or their compounds may be present in the form of sedimentation or particles. This can be practiced, for example, by dispersing a plurality of kinds of water soluble metal solutions in super fine particles in the dispersion, and by sedimenting or reducing them into particles. In this case, by adjusting the concentration of the individual water soluble metal solutions, it is possible to make a structure in which particles of one metal are carried on particles of the other metal. If these metal particles are carried in the buried state on the carrier, it is possible to inhibit the reaction between the carrier and the catalytic metal having a high affinity with the carrier. As a result, the carrying effect of the catalytic metal can be improved to provide an excellent active catalyst as a whole even though the catalytic metal is used in a small quantity.

Here will be described embodiments of an exhaust gas purifying catalyst and a process for producing the same in accordance with the invention.

(Embodiment 1)

γ-alumina powder is dipped, while being agitated, for 1 hour in a solution of dinitroammine platinum (Pt) containing a predetermine quantity of platinum and is filtered and dried and temporarily sintered to produce Pt/γ-alumina catalyst.

This catalyst is sintered at 600° C. for 1 hour and is then reduced in a hydrogen gas flow at 400° C. to produce Pt particles. These Pt particles have a diameter of about 2 nm.

Next, this powder is dipped for a predetermined time period in a liquid which is prepared by dissolving aluminum triisopropoxide in cyclohexane, and is then filtered. The resultant increase in the weight is the aluminum content which is newly carried. The Al molar concentration of the solution of aluminum triisopropoxide/cyclohexane is adjusted to regulate the quantity of aluminum carriage. The Al carriage at this time is about 0.1 to 0.4 (mols/1 mol of $Al_2O_3$), which forms one to several layers over alumina of 200 m²/g. After this, a sintering is performed to produce the catalyst. Here, the quantity of carriage of Pt is 2 g/l (2 g per 1 liter of the carrier).

(Embodiment 2)

This is an example of the micro emulsion method. 5 wt. % solution of platinic chloride is added to 0.5M (M: mol/litter) of a solution of NP-5/cyclohexane to prepare a W/O type micro emulsion (i.e., Micro Emulsion 1). Next, a solution containing ammonium chloride of moles as high by three times than the moles of Pt is prepared, and 0.5M of another solution of NP-5/cyclohexane is added while being agitated, to prepare a W/O type micro emulsion (i.e., Micro Emulsion 2). The W/O values at this time are individually adjusted to about 2 to 20. Here, the W/O value is a molar concentration of the liquid droplets to one mol of the surface-active agent.

Next, those Micro Emulsions 1 and 2 are mixed and agitated at the room temperature for a predetermined time period. At this time, the ammonium chloride of Pt is gradually sedimented in the micro emulsion, and this sedimentation agglomerates with the time to become coarse (the agitation is done for about 10 minutes).

The micro emulsion containing this sedimentation is agitated and poured into aluminum isopropoxide dissolved cyclohexane to effect the hydrolysis of aluminum. The water is hardly dissolved in cyclohexane, but the hydrolysis occurs over a very wide interface of the micro emulsion to produce alumina. At the micelle having the sedimentation, the alumina, as produced by the hydrolysis around the sedimented particles, is produced to enclose the particles to some extent (e.g., 20 to 90%). This hydrolysis is continued for about 10 minutes, and then the centrifugal separations and the washings with ethanol are performed several times. Then, the drying is performed for 12 hours.

The residual surface-active agent was burned at 350° C. in the air flow and was then sintered with air at 700° C. for 2 hours to produce the catalyst. Here, the Pt particles had an average diameter of 1.5 nm, and the carriage was 2 g/l (2 g per 1 liter of the carrier).

The catalysts, as produced from Embodiment 1 and Embodiment 2, and the catalyst of Prior Art 1, in which Pt was carried on the alumina by the impregnation method, were examined on the thermal deterioration characteristics and the catalyst performances after the thermal deterioration. Here, the quantity of the carriage of platinum was 2 g/l (2 g per 1 liter of the carriage) for both the individual embodiments and the prior art. The thermal deterioration characteristics were examined by the heating in the air at 700° C. and confirmed in terms of the change in the particle diameter at intervals. Here, the particle diameter was measured in view of the TEM dark field image. The measured results are tabulated in FIG. 8.

Figure 8:
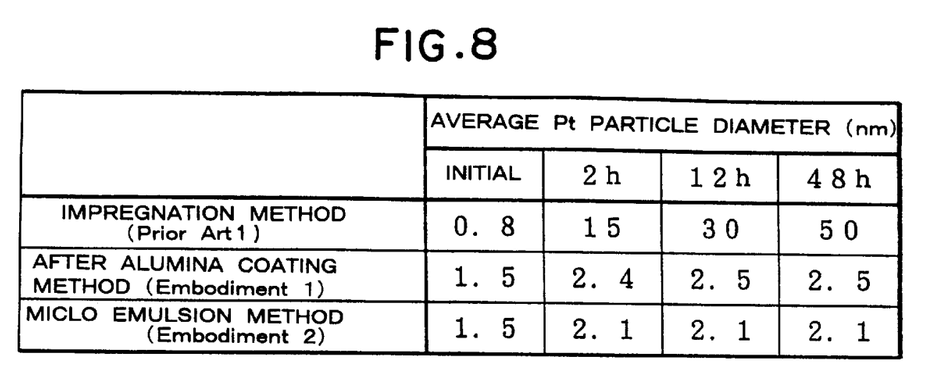
FIG. 8 is a diagram tabulating the measured results of changes in the diameter of a Pt particle in Embodiments 1 and 2 and Prior Art 1.

As seen from FIG. 8, in the catalysts of Embodiment 1 and Embodiment 2 of the invention, the particle diameter of the platinum or the catalytic activation particles increases by 40 to 60% after lapse of 2 hours but then becomes stable so that the sintering does not progress. This is because the platinum particles are buried in the carrier and prevented from their migrations. In Prior Art 1, on the contrary, the particle diameter of the platinum particles increases with the lapse of time so that it grows as large by 62.5 times as the initial value after the lapse of 48 hours so that the sintering progresses.

Moreover, the warming-up performances after the thermal deterioration were measured. The catalysts were kept at 700° C. in the air for 48 hours, and their 50% purification temperatures were measured by passing the exhaust gases containing concentrations of 5,000 ppmC, 5,000 ppm and 4,000 ppm of hydrocarbons, carbon monoxide gases and nitrogen oxides therethrough. The results of measurements are tabulated in FIG. 9.

Figure 9:
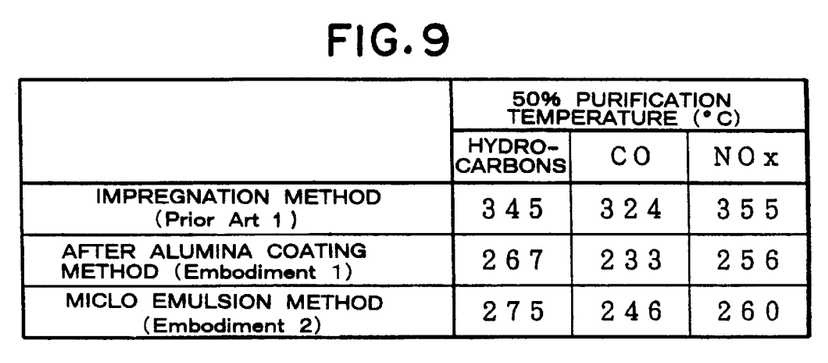
FIG. 9 is a diagram tabulating the measured results of a 50% purification temperature by catalysts of Embodiments 1 and 2 and Prior Art 1.

As seen from FIG. 9, the exhaust gas purifying catalyst of the invention exhibits a sufficient purification performance at a lower temperature than in the prior art. It is thought that the exhaust gas purifying catalyst of the invention is little deteriorated, even if it is exposed to a high temperature, so that the sintering does not progress. Here will be enumerated embodiments in which two kinds of catalytic metals are carried in a common particle.

(Embodiment 3)

A mixed solution (having a concentration of 5 wt. %) of platinic chloride and rhodium chloride is adjusted at a carriage ratio between Pt and Rh. This solution is added while being agitated to 0.5M of a solution of NP-5/cyclohexane to prepare a W/O type micro emulsion (i.e., Micro Emulsion 1). Next, a solution containing an ammonium chloride having a molar concentration of three times as high as the addition of Pt and Rh is prepared and added while being agitated to 0.5M of another solution of NP-5/cyclohexane to prepare a W/O type micro emulsion (i.e., Micro Emulsion 2). The W/O value at this time is adjusted to about 2 to 20.

Next, those Micro Emulsions 1 and 2 are mixed and agitated at the room temperature for a predetermined time period. At this time, the salts of Pt and Rh and the ammonium chloride of Pt are gradually sedimented in the micro emulsion, and this sedimentation agglomerates with the time to become coarse (the agitation is done for about 10 minutes).

The micro emulsion containing this sedimentation is agitated and poured into aluminum isopropoxide dissolved cyclohexane to effect the hydrolysis of aluminum. The water is hardly dissolved in cyclohexane, but the hydrolysis occurs over a very wide interface of the micro emulsion to produce alumina. At the micelle having the sedimentation, the alumina, as produced by the hydrolysis around the sedimented particles, is produced to enclose the particles to some extent (e.g., 20 to 90%). This hydrolysis is continued for about 10 minutes, and then the centrifugal separations and the washings with ethanol are performed several times. Then, the drying is performed for 12 hours.

The residual surface-active agent was burned at 350° C. in the air flow and was then sintered with air at 700° C. for 2 hours to produce the catalyst. Here, the Pt/Rh particles had an average diameter of 1.5 nm, and the carriage was 2 g/l (2 g per 1 liter of the carrier).

(Embodiment 4)

This belongs to a preparation by a reduction. 5 wt. % of a solution of dinitroamine platinum and 5 wt. % of a solution of rhodium nitrate are added in a predetermined quantity while being agitated to 0.5M of a solution of NP-5/cyclohexane to prepare a W/O type micro emulsion (i.e., Micro Emulsion 1). Next, a solution containing hydrazine-monohydrate having a molar concentration of three times as high as the addition of Pt and Rh is prepared and added while being agitated to 0.5M of another solution of NP-5/cyclohexane to prepare a W/O type micro emulsion (i.e., Micro Emulsion 2). The W/O value at this time is adjusted to about 2 to 20.

Next, those Micro Emulsions 1 and 2 are mixed and agitated at 50° C. for a predetermined time period. At this time, the Pt/Rh particles gradually grow in the micro emulsion, and these particles agglomerate with the time to become coarse (the agitation is done for about 3 to 10 minutes).

The micro emulsion containing this sedimentation is agitated and poured into aluminum isopropoxide dissolved cyclohexane to effect the hydrolysis of aluminum. The water is hardly dissolved in cyclohexane, but the hydrolysis occurs over a very wide interface of the micro emulsion to produce alumina. At the micelle having the Pt/Rh particles, the alumina, as produced by the hydrolysis around the particles, is produced to enclose the particles to some extent (e.g., 20 to 90%). This hydrolysis is continued for about 10 minutes, and then the centrifugal separations and the washings with ethanol are performed several times. Then, the drying is rformed for 12 hours.

The residual surface-active agent was burned at 350° C. in the air flow and was then sintered with air at 700° C. for 2 hours to produce the catalyst. Here, the Pt/Rh particles had an average diameter of 1.5 nm, and the carriage was 2 g/l (2 g per 1 liter of the carrier).

The warming-up performances (at the 50% purification temperature) in the stoichiometric air/fuel ratio feedback were measured for the catalysts thus prepared by Embodiment 3 and Embodiment 4. In addition, similar tests were made as Prior Art 2 and Prior Art 3 for the catalyst prepared by the impregnation method, the catalyst (Comparison 1) carrying only Pt by a method similar to that of Embodiment 3, and the catalyst (Comparison 2) sedimenting only Pt (but not Rh) by a method similar to that of Embodiment 3. Here, the carriages of the individual components were: 1.2 g/l (1.2 g per 1 liter of the carrier) for Pt; 0.1 g/l (0.1 g per 1 liter of the carrier) for Rh; and 120 g/l (120 g per 1 liter of the carrier) for γ-alumina. The concentrations of hydrocarbons, carbon monoxide gas and nitrogen oxides in the exhaust gas were 5,000 ppmC, 5,000 ppm and 4,000 ppm, respectively, and the space velocity was 25,000/hr. The results are tabulated in FIG. 10.

Figure 10:
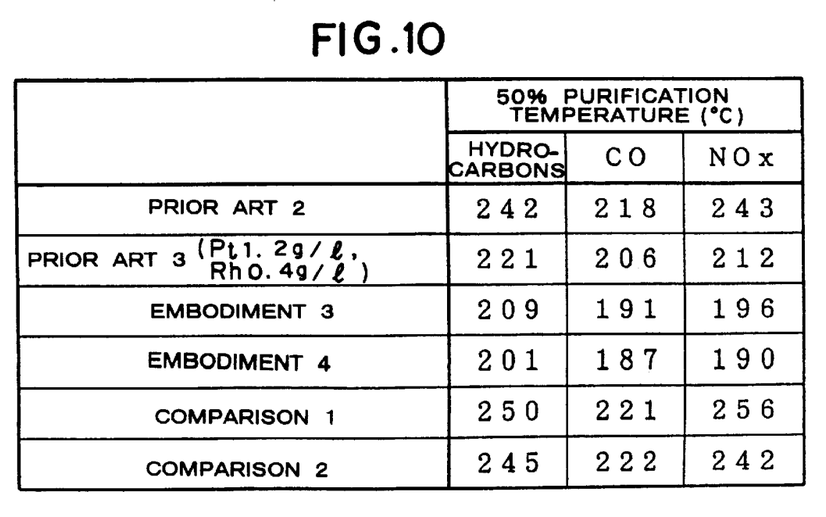
FIG. 10 is a diagram tabulating the measured results of a 50% purification temperature by catalysts of Embodiments 3 and 4, Prior Arts 2 and 3 and Comparisons 1 and 2.

According to the exhaust gas purifying catalyst of the invention, as seen from the measurement results tabulated in FIG. 10, the purification performances are improved, if the carriage of rhodium is equal, by about 15 to 17% for hydrocarbons, about 13 to 15% for carbon monoxide gas, and by about 20 to 22% for nitrogen oxides. The improvement in the purification performance of about 5 to 8% is found even in comparison with the catalyst of the prior art in which the carriage of rhodium is increased by four times from that of the invention.

As seen from Comparison 1 and Comparison 2, moreover, the catalyst performance is improved by using the rhodium together, but Comparison 2 having no sedimentation of rhodium (or no rhodium carried on the platinum particles) is inferior in the performance to the catalyst according to the invention. This is thought to come from that rhodium reacts with the alumina or the carrier to lose its activation.

(Embodiment 5)

This is an example for producing Pt/Pd particles by a reduction. 5 wt. % of a solution of dinitroamine platinum and 5 wt. % of a solution of palladium nitrate are added in a predetermined quantity while being agitated to 0.5M of a solution of NP-5/cyclohexane to prepare a W/O type micro emulsion (i.e., Micro Emulsion 1). Next, a solution containing hydrazine-monohydrate having a molar concentration of three times as high as the addition of Pt and Pd is prepared and added while being agitated to 0.5M of another solution of NP-5/cyclohexane to prepare a W/O type micro emulsion (i.e., Micro Emulsion 2). The W/O value at this time is adjusted to about 2 to 20.

Next, those Micro Emulsions 1 and 2 are mixed and agitated at 50° C. for a predetermined time period. At this time, the Pt/Pd particles gradually grow in the micro emulsion, and these particles agglomerate with the time to become coarse (the agitation is done for about 3 to 10 minutes).

The micro emulsion containing this sedimentation is agitated and poured into aluminum isopropoxide dissolved cyclohexane to effect the hydrolysis of aluminum for about 10 minutes. The water is hardly dissolved in cyclohexane, but the hydrolysis occurs over a very wide interface of the micro emulsion to produce alumina. At the micelle having the Pt/Pd particles, the alumina, as produced by the hydrolysis around the particles, are produced to enclose the particles to some extent (e.g., 20 to 90%). After this, the centrifugal separations and the washings with ethanol are performed several times. Then, the drying is performed for 12 hours.

The residual surface-active agent was burned at 350° C. in the air flow and was then sintered with air at 700° C. for 2 hours to produce the catalyst. Here, the Pt/Pd particles had an average diameter of 3 nm, and the carriage was 3 g/l (3 g per 1 liter of the carrier).

In the catalyst produced by Embodiment 5, the Pt particles were very fine and were carried while being coated with the carrier of alumina so that the catalyst was free from the sintering and exhibited a higher durability than that produced by the impregnation method of the prior art. In the structure, moreover, the Pd particles were stably carried on the Pt particles so that the catalyst could improve the exhaust gas purifying performance in addition to the effect of preventing the sintering.

(Embodiment 6)

This is an example for producing Pd/Rh particles by a reduction. 5 wt. % of a solution of palladium nitrate and 5 wt. % of a solution of rhodium nitrate are added in a predetermined quantity while being agitated to 0.5M of a solution of NP-5/cyclohexane to prepare a W/O type micro emulsion (i.e., Micro Emulsion 1). Next, a solution containing hydrazine- monohydrate having a molar concentration of three times as high as the addition of Pd and Rh is prepared and added while being agitated to 0.5M of another solution of NP-5/cyclohexane to prepare a W/O type micro emulsion (i.e., Micro Emulsion 2). The W/O value at this time is adjusted to about 2 to 20.

Next, those Micro Emulsions 1 and 2 are mixed and agitated at 50° C. for a predetermined time period. At this time, the Pd/Rh particles gradually grow in the micro emulsion, and these particles agglomerate with the time to become coarse (the agitation is done for about 3 to 10 minutes).

The micro emulsion containing this sedimentation is agitated and poured into aluminum isopropoxide dissolved cyclohexane to effect the hydrolysis of aluminum. The water is hardly dissolved in cyclohexane, but the hydrolysis occurs over a very wide interface of the micro emulsion to produce alumina. At the micelle having the Pd/Rh particles, the alumina, as produced by the hydrolysis around the particles, is produced to enclose the particles to some extent (e.g., 20 to 90%). This hydrolysis is continued for about 10 minutes, and then the centrifugal separations and the washings with ethanol are performed several times. Then, the drying is performed for 12 hours.

The residual surface-active agent was burned at 350° C. in the air flow and was then sintered with air at 700° C. for 2 hours to produce the catalyst. Here, the Pd/Rh particles had an average diameter of 3 nm, and the carriage was 3 g/l (3 g per 1 liter of the carrier).

The catalyst produced by Embodiment 6 acquired a structure in which the Rh particles were carried on the surfaces of the Pd particles. As a result, it was found that the reaction between the palladium and the alumina making the carrier could be prevented to keep the activity of the Rh particles to provide an excellent performance for reducing the nitrogen oxides (NOx) when the gasoline engine is run in the vicinity of the stoichiometric air/fuel ratio. In the catalyst produced by the impregnation method of the prior art, on the contrary, the reaction between the rhodium and the carrier vigorously occurred to provide no structure in which the Rh particles adhered to the surfaces of the Pd particles.

Here will be described embodiments of a catalyst preventing the reaction between the catalytic element and the oxide carrier, and a process for producing the catalyst.

(Embodiment 7)

5 wt. % of a solution of palladium nitrate is added while being agitated to 0.5M of a solution of NP-5/cyclohexane to prepare a W/O type micro emulsion (i.e., Micro Emulsion 1). Next, a solution containing hydrazine-monohydrate having a molar concentration of three times as high as that of Pd is prepared and added while being agitated into 0.5M of another solution of NP-5/cyclohexane to prepare a W/O type micro emulsion (i.e., Micro Emulsion 2). The W/O value at this time is adjusted to about 2 to 20.

Next, those Micro Emulsions 1 and 2 are mixed and agitated at 40° C. for a predetermined time period. At this time, the Pd is gradually reduced in the micro emulsion to produce Pd particles, and these particles agglomerate with the time to become coarse (the agitation is done for about 3 to 10 minutes, and the particle size is about 3 nm).

The micro emulsion containing this Pd particles is agitated and poured into aluminum isopropoxide dissolved cyclohexane to effect the hydrolysis of aluminum. The water is hardly dissolved in cyclohexane, but the hydrolysis occurs over a very wide interface of the micro emulsion to produce alumina. At the micelle having the particles, the alumina, as produced by the hydrolysis around the particles, is produced to enclose the particles to some extent (e.g., 20 to 90%). This hydrolysis is continued for about 10 minutes, and then the centrifugal separations and the washings with ethanol are performed several times. Then, the drying is performed for 12 hours.

The residual surface-active agent was burned at 350° C. in the air flow and was then sintered with air at 700° C. for 2 hours to produce the catalyst. Here, the carriage of Pd was 2 g/l (2 g per 1 liter of the carrier).

The hydrocarbon oxidation and warming-up characteristics were tested for this catalyst. For comparisons, similar tests were also performed individually for the catalyst Prior Art 4), in which 2 g/l (2 g per 1 liter of the carrier) of Pd was carried by the impregnation method of the prior art, and the catalyst (Prior Art 5), in which 5 g/l was carried. Here, the testing conditions were the carriage of γ-alumina of 120 g/l (120 g per 1 liter of the carrier), the space velocity of 25,000/hr., the concentration of $O_2$ of 6%, and the concentration of hydrocarbons ($C_3H_6$) of 2,000 ppmC. The results are tabulated in FIG. 11.

Figure 11:
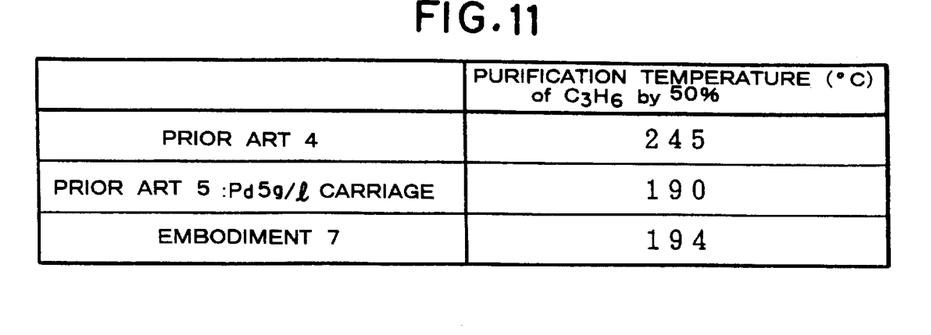
FIG. 11 is a diagram tabulating the measured; results of a 50% purification temperature of $C_3H_6$ by catalysts of Embodiment 7 and Prior Arts 4 and 5.

In the catalyst of the invention, as tabulated in FIG. 11, the Pd particles had a small particle diameter and were carried in the buried state by the carrier so that the performance was improved by 20% or more over the catalyst of the prior art to a level similar to that of Prior Art 5 having a carriage of Pd by 2.5 times. According to the invention, therefore, it is possible to reduce the quantity of using the catalytic metal.

(Embodiment 8)

5 wt. % of a solution of palladium nitrate is added while being agitated to 0.5M of a solution of NP-5/cyclohexane to prepare a W/O type micro emulsion (i.e., Micro Emulsion 1). Next, a solution containing hydrazine-monohydrate having a molar concentration of three times as high as that of Pd and barium acetate of five times is prepared and added while being agitated into 0.5M of another solution of NP-5/cyclohexane to prepare a W/O type micro emulsion (i.e., Micro Emulsion 2). The W/O value at this time is adjusted to about 2 to 20.

Next, those Micro Emulsions 1 and 2 are mixed and agitated at 40° C. for a predetermined time period while bubbling a carbon dioxide gas. At this time, the Pd is gradually reduced in the micro emulsion to produce Pd particles, and barium sediments as barium carbonate. The Pd particles and the barium carbonate particles agglomerate with the time to become coarse (the agitation is done for about 3 to 10 minutes, and the Pd particle size is about 3 nm. The barium particle diameter is not measured.).

The micro emulsion containing this Pd particles is agitated and poured into aluminum isopropoxide dissolved cyclohexane to effect the hydrolysis of aluminum. The water is hardly dissolved in cyclohexane, but the hydrolysis occurs over a very wide interface of the micro emulsion to produce alumina. At the micelle having the particles, the alumina, as produced by the hydrolysis around the particles, is produced to enclose the particles to some extent (e.g., 20 to 90%). This hydrolysis is continued for about 10 minutes, and then the centrifugal separations and the washings with ethanol are performed several times. Then, the drying is performed for 12 hours.

The residual surface-active agent was burned at 350° C. in the air flow and was then sintered with air at 700° C. for 2 hours to produce the catalyst. Here, the carriage of Pd was 2 g/l (2 g per 1 liter of the carrier), and carriage of the γ-alumina was 120 g/l (120 g per 1 liter of the carrier).

For the catalyst of Embodiment 7 and the catalyst of Embodiment 8, the hydrocarbon purifying performance was tested after a hot lean durability. Here, this hot lean durability was tested at an air/fuel ratio (A/F) of 22, at 700° C. for 50 hours. The testing conditions of the purification performance were identical to those described in Embodiment 7. For comparison, moreover, similar tests were made on both the catalyst of Prior Art 4, as employed in Embodiment 7, and the catalyst (of Prior Art 6) in which 2 g/l (2 g per 1 liter of the carrier) of Pd and 30 wt. % of Ba were carried by the impregnation method of the prior art. The results are tabulated in FIG. 12.

Figure 12:
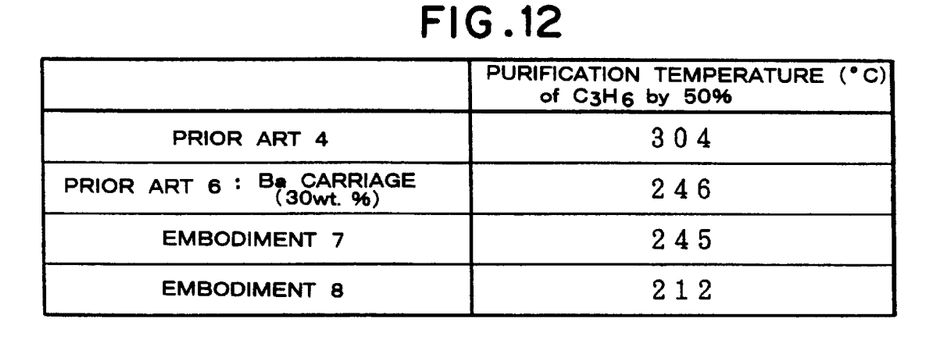
FIG. 12 is a diagram tabulating the measured results of a 50% purification temperature of $C_3H_6$ by catalysts of Embodiments 7 and 8 and Prior Arts 4 and 6.

As seen from the test results of FIG. 12, the catalyst of Embodiment 8 carrying Ba can acquire a durability performance higher by more than 30% than that of the catalyst of the prior art. This is thought to come from that the Ba is selectively carried around the Pd particles to inhibit the reaction drastically between the alumina carrier and the Pd particles.

Here, the method to sediment the reaction inhibiting element such as Ba is exemplified not only by bubbling the carbon dioxide gas but also by using sodium hydrogencarbonate.

(Embodiment 9)

5 wt. % of a solution of rhodium nitrate is added while being agitated to 0.5M of a solution of NP-5/cyclohexane to prepare a W/O type micro emulsion (i.e., Micro Emulsion 1). Next, a solution containing hydrazine-monohydrate having a molar concentration of three times as high as that of Rh is prepared and added while being agitated into 0.5M of another solution of NP-5/cyclohexane to prepare a W/O type micro emulsion (i.e., Micro Emulsion 2). The W/O value at this time is adjusted to about 2 to 20.

Next, those Micro Emulsions 1 and 2 are mixed and agitated at the room temperature for a predetermined time period. At this time, the hydrazine complex particles are gradually produced in the micro emulsion to sediment. These Rh sedimented particles agglomerate with the time to have a larger particle diameter (the agitation is done for about 2 to 20 minutes, and the Rh particle size is about 3 nm).

The micro emulsion containing these Rh sedimented particles is agitated and poured into aluminum isopropoxide dissolved cyclohexane to effect the hydrolysis of aluminum. The water is hardly dissolved in cyclohexane, but the hydrolysis occurs over a very wide interface of the micro emulsion to produce alumina. At the micelle having the particles, the alumina, as produced by the hydrolysis around the particles, is produced to enclose the particles to some extent (e.g., 20 to 90%). This hydrolysis is continued for about 10 minutes, and then the centrifugal separations and the washings with ethanol are performed several times. Then, the drying is performed for 12 hours.

The residual surface-active agent was burned at 350° C. in the air flow and was then sintered with air at 700° C. for 2 hours to produce the catalyst. Here, the carriage of Rh was 1 g/l (1 g per 1 liter of the carrier), and the carriage of γ-alumina was 120 g/l (120 g per 1 liter of the carrier).

(Embodiment 10)

As in Embodiment 9, 5 wt. % of a solution of rhodium nitrate is added while being agitated to 0.5M of a solution of NP-5/cyclohexane to prepare a W/O type micro emulsion (i.e., Micro Emulsion 1). Next, a solution containing hydrazine-monohydrate having a molar concentration of three times as high as that of Rh is prepared and added while being agitated into 0.5M of another solution of NP-5/cyclohexane to prepare a W/O type micro emulsion (i.e., Micro Emulsion 2). The W/O value at this time is adjusted to about 2 to 20.

Next, those Micro Emulsions 1 and 2 are mixed and agitated at the room temperature for a predetermined time period. At this time, the hydrazine complex particles are gradually produced in the micro emulsion to sediment. These Rh sedimented particles agglomerate with the time to have a larger particle diameter (the agitation is done for about 2 to 20 minutes, and the Rh particle size is about 3 nm).

The micro emulsion containing these Rh sedimented particles is at first agitated and poured into zirconium isopropoxide dissolved cyclohexane. Instantly, the solution becomes sol. After two minutes, this sol is then agitated and poured into aluminum isopropoxide dissolved cyclohexane to subject aluminum to a hydrolysis with the residual water. The water is hardly dissolved in cyclohexane, but the hydrolysis occurs over a very wide interface of the micro emulsion to produce alumina. At the micelle having the particles, the alumina, as produced by the hydrolysis around the particles, are produced to enclose the particles to some extent (e.g., 20 to 90%). This hydrolysis is continued for about 10 minutes, and then the centrifugal separations and the washings with ethanol are performed several times. Then, the drying is performed for 12 hours.

The residual surface-active agent was burned at 350° C. in the air flow and was then sintered with air at 700° C. for 2 hours to produce the catalyst. Here; the carriage of Rh was 1 g/l (1 g per 1 liter of the carrier); the carriage of $ZrO_2$ was 1 g/l (1 g per 1 liter of the carrier); and the carriage of γ-alumina was 120 g/l (120 g per 1 liter of the carrier).

Figure 7:
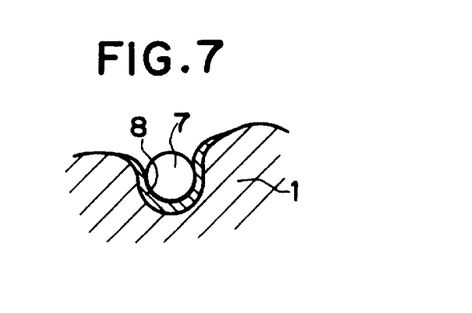
FIG. 7 is a diagram conceptionally showing an embodiment in which a $ZrO_2$ layer is formed around a Rh particle in accordance with the invention.

The structure of the catalyst, as produced in Embodiment 10, is conceptionally shown in FIG. 7. Around an Rh particle 7, there is formed a $ZrO_2$ layer 8, the outer circumference of which is formed of the alumina layer 1. This results in a structure in which the Rh particle 7 coated with the $ZrO_2$ layer 8 is so carried in the buried state by the carrier 1 of alumina.

The catalyst of Embodiment 9 and the catalyst of Embodiment 10 are structurally different in the presence of the $ZrO_2$ layer 8, and the warming-characteristics up characteristics after the duration were tested for examining the influences of the difference. The testing conditions were the carriage of Rh of 2 wt. %, the space velocity of 25,000/hr., the concentration of nitrogen monoxide gas of 2,500 ppm, and the concentration of carbon monoxide gas of 2,500 ppm. The results are tabulated in FIG. 13.

Figure 13:
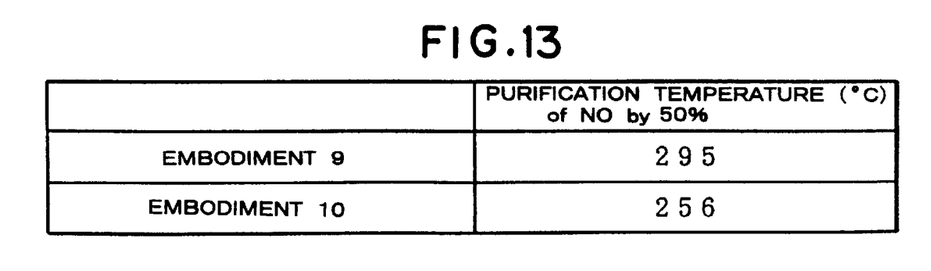
FIG. 13 is a diagram tabulating the measured results of a 50% purification temperature of nitrogen oxides by catalysts of Embodiments 9 and 10.

As seen from the results of FIG. 13, the catalyst having the $ZrO_2$ layer 8 is improved in the purification performance by about 15%. This is because the reduction in the catalytic activity of the Rh particles is prevented by forming the $ZrO_2$ layer 8.

What is claimed is:

1. A process for producing an exhaust gas purifying catalyst comprising catalytic activation particles composed of a catalytic element or a compound of the catalytic element carried on a carrier, the process comprising:

depositing and agglomerating said catalytic activation particles into a desired particle diameter; and forming said carrier around said catalytic activation particles, wherein the catalytic activation particles carried on said carrier are exposed to the outside of said carrier, and are coated with said carrier by 20 to 90% of their whole surface area.

2. A process for producing an exhaust gas purifying catalyst according to claim 1, wherein the desired particle diameter of said catalytic activation particles is from about 1 nm to about 3 nm.

3. A process for producing an exhaust gas purifying catalyst according to claim 1, wherein said catalytic activation particles carried on said carrier are exposed to the outside of said carrier by 80 to 10% of their whole surface area.

4. A process for producing an exhaust gas purifying catalyst comprising catalytic activation particles composed of a catalytic element or a compound of the catalytic element carried on a carrier, the process comprising:

forming a micelle containing said catalytic activation particles by agitating and mixing a micro emulsion containing said catalytic activation particles prepared to a desired particle diameter, into a surface-active agent containing said carrier; and forming said carrier to enclose said catalytic activation particles in said micelle, wherein the catalytic activation particles carried on said carrier are exposed to the outside of said carrier, and are coated with said carrier by 20 to 90% of their whole surface area.

5. A process for producing an exhaust gas purifying catalyst according to claim 4, wherein the desired particle diameter of said catalytic activation particles is from about 1 nm to about 3 nm.

6. A process for producing an exhaust gas purifying catalyst according to Claim 4, wherein said catalytic activation particles carried on said carrier are exposed to the outside of said carrier by 80 to 10% of their whole surface area.

* * * * *